United States Patent [19]

Jagannathan et al.

[11] Patent Number: 4,855,028

[45] Date of Patent: Aug. 8, 1989

[54] PARTICULATE MAGNETIC RECORDING MEDIA HAVING AN AREALLY CONTROLLED RECORDING CHARACTERISTIC

[75] Inventors: Ramesh Jagannathan, San Diego; Matthew R. Bye, San Francisco, both of Calif.

[73] Assignee: Eastman Kodak Company, Rochester, N.Y.

[21] Appl. No.: 270,940

[22] Filed: Nov. 14, 1988

Related U.S. Application Data

[62] Division of Ser. No. 924,529, Oct. 29, 1986.

[51] Int. Cl.$^4$ ................................................ C25D 15/00
[52] U.S. Cl. ................................ 204/180.2; 204/181.4
[58] Field of Search ..................... 204/16, 180.2, 181.4

[56] References Cited

U.S. PATENT DOCUMENTS

3,117,065  1/1964  Wooten .................... 204/20
3,715,285  2/1973  Tsuchiya ................... 204/16

*Primary Examiner*—T. M. Tufariello
*Attorney, Agent, or Firm*—Daniel Robbins

[57] ABSTRACT

Utilizing the technique whereby particulate media electrodeposited at a critical electric field intensity has a given packing density, and when electrodeposited at a lesser electric field intensity has a lower density, the present invention teaches electrodeposition of media whose particulate packing density varies in accordance with an areally predetermined pattern. The pattern is incised in one electrode of the deposition apparatus, and the medium as deposited on the other electrode mirrors the pattern as a varying particulate packing density. The packing density varies with the electric field intensity, and the electric field varies due to the unequal interelectrode distances arising from the incisions in the electrode. The medium is then d.c. magnetically reproducible signal in accordance with the pattern.

1 Claim, 7 Drawing Sheets

PARTICULATE MAGNETIC RECORDING MEDIA HAVING AN AREALLY CONTROLLED RECORDING CHARACTERISTIC

This is a division of application Ser. No. 924,529, filed Oct. 29, 1986.

BACKGROUND OF THE INVENTION

1. Field of the Invention

This invention relates to particulate magnetic media for digital recording on floppy disks, and in particular to media whose volumetric packing density, and hence recording characteristic, is controlled to magnetically replicate a predetermined pattern.

The invention, as well as the prior art, will be described with reference to the figures, of which:

FIG. 1 is an illustration of the track and guard band configuration of a 360,000 byte floppy disk known in the prior art, FIG. 3 is an illustration of the track and guard band configuration of a 3.3 megabyte floppy disk known in the prior art, FIG. 3 is a schematic representation of the format of a 3.3 megabyte floppy disk, FIG. 4 is an illustration of apparatus for the electrodeposition of magnetic media according to the prior art, FIG. 5 is a graph useful in understanding the principle of the invention, FIGS. 6a, 6b are illustrations of particle alignment useful in understanding the invention, FIG. 7 is a perspective drawing of a pattern incised in an anode in accordance with the invention, FIG. 8 is a drawing showing an expanded view of the pattern of FIG. 7, and FIG. 9 is an illustration of a portion of electrodeposition apparatus according to the invention.

2. Description Relative the the Prior Art

The magnetic floppy disk is one of the most important and widely used storage media available for digital data recording. It has the advantage of inexpensive storage of large quantities of data with relatively fast access time for data recovery. For use with modern personal computers, a typical double-sided floppy disk of 5¼" diameter may store up to 360,000 bytes of data formatted in 40 concentric tracks per side of the disk, each of which is divided into eight sectors. The formatting includes recorded control and addressing information for each track and sector, and allocates segments within each track and sector for the recording of data during subsequent operation. Current disk drives utilizing the formatted disk track and sector addresses can access data located anywhere on the disk in about 150 milliseconds, and this data can be read and transferred from the disk at the rate of 250,000 bits per second.

It will be appreciated that such disk drives attain this performance while operating "open loop", that is, the disk drive read/write head is positioned over the track to be written or read by a directly driven actuator. There is no feedback derived from the head positioning which indicates that the desired position has, in fact, been attained. The disk drive system relies upon the mechanical accuracy built into the head actuator and the mechanisms which locate, clamp and rotate the floppy disk to insure the repeatability of positioning the read/write head directly over any preselected track of the disk. The tolerances on the track widths, track locations on the disk, and of the mechanical elements of the drive required for reliable operation, are obtainable at reasonable cost when the storage capacity is approximately 300,000-400,000 bytes per disk. Some higher precision open-loop drives are available which store one megabyte per disk. The magnetic surfaces of the floppy disk, however, considered solely as recording surfaces, are capable of much higher storage capacity than the above mentioned 360,000 bytes. The limitations on realizing the disk's full storage capability are due to the mechanical and economic constraints associated with the drive itself, and not to the magnetics of the recording surface.

There is considerable activity in the art in attaining the potential higher storage densities afforded by the 5¼" floppy disk. One example is Eastman Kodak Company's 3.3 Megabyte Flexible 5¼" Drive, which uses 160 tracks per disk side as compared to the 40 tracks per disk side of the 360,000 byte disk drive. The track density of the Kodak drive is therefore, increased by a factor of 4 compared to the 360,000 byte drive. The linear recording density along each track is also increased by a factor of approximately 2.3, for an overall increase in capacity between the two drives of a factor of 9.2.

Figure 1:
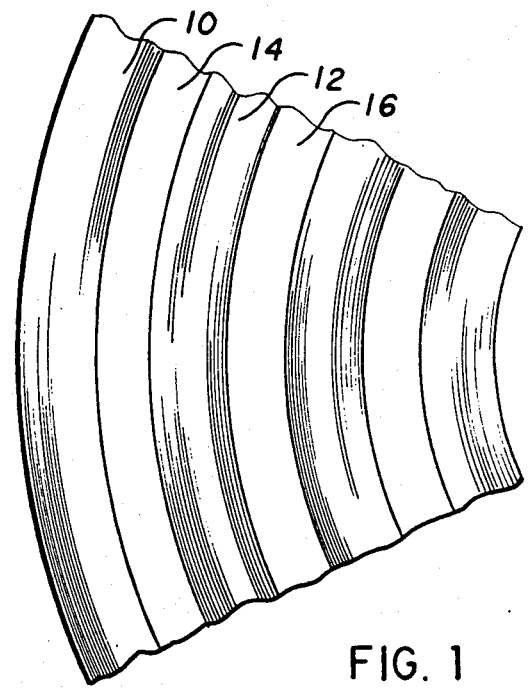
Figure 2:
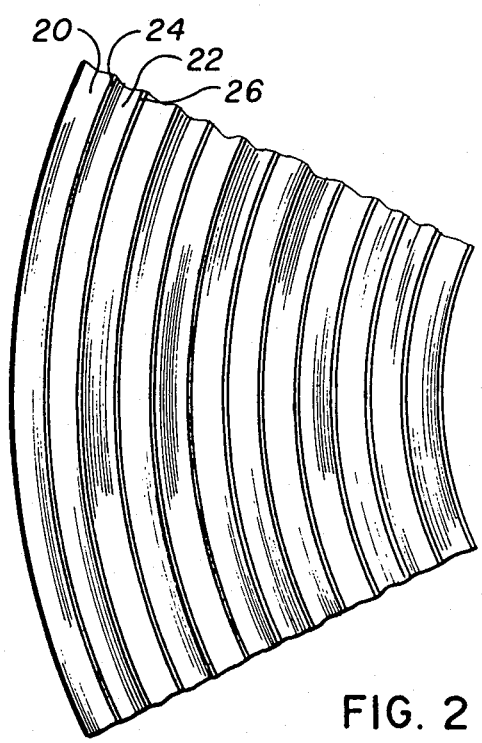

The track pitch of the 360,000 byte drive is 48 tracks per inch while that of the 3.3 Megabyte drive is 192 tracks per inch. Referring to FIG. 1 relating to the lower density 360,000 byte drive, typical tracks 10, 12 are shown separated by guard bands 14, 16. The guard bands 14, 16 have no signal recorded on them, and they provide buffer zones to prevent misreading of the data recorded on a track due to signal interference from an adjacent track if the head is positioned slightly off the selected track during a read operation. Because the 360,000 byte drive employs "open loop" positioning of the read/write head, generous guard bands are provided relative to the track width dimensions. The tracks 10, 12 are 0.012" wide, and the guard bands 14, 16 are 0.009" wide; i.e., the guard bands are 75 percent as wide as the tracks proper. On the other hand, as shown in FIG. 2 for the 3.3 Megabyte drive, the tracks 20, 22 and guard bands 24, 26 are both considerably reduced in size to attain the higher track density of 192 tracks per inch. The tracks 20, 22 are 0.0047" wide, and the guard bands 24, 26 are 0.0005" wide; the guard bands are, therefore, only 11 percent as wide as the data tracks.

This reduction in track width and guard band width has a decisive impact on the method of head positioning in high density drives. Reduced mechanical dimensions precludes the economically feasible use of open loop head positioning. Attaining the mechanical precision necessary for open loop head positioning would be prohibitively expensive, and alternative techniques for accurate locating of the head have been developed; these techniques generally "lock" the head to the track being read by means of servo action. One such technique utilizes a set of control signals accurately prerecorded on the disk. During operation, the head is positioned by open loop means to the approximate position of the track to be read, and then the head is servo-positioned, using the recorded control signal associated with the given track, to the precise location for reading track data. Generally, the disk surface is divided into sectors and each track's control signals are repeated in each sector. Servoing action, therefore, occurs several times during each disk rotation, and the head position for the track being read is corrected in each sector as the control signals come under the read head.

Figure 3:
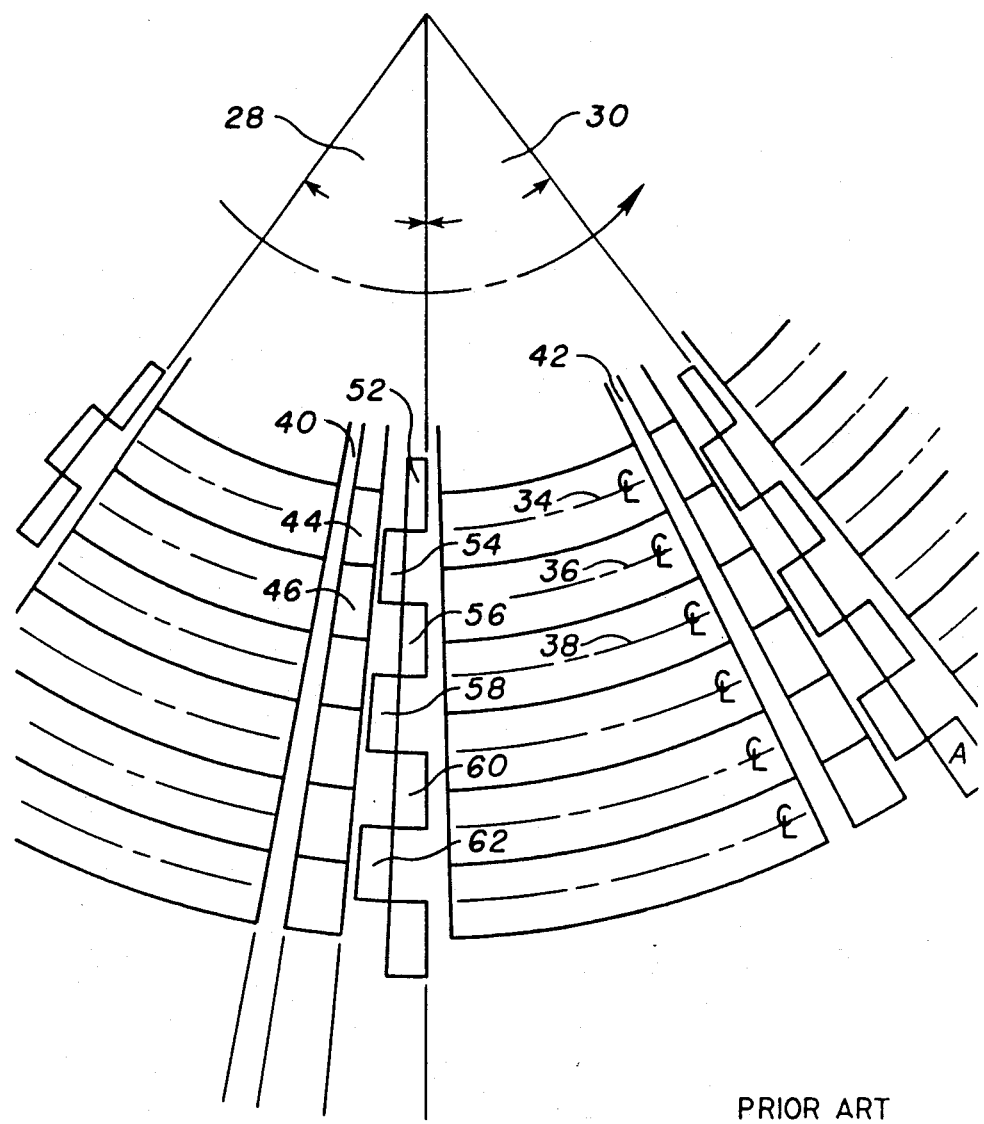

The servoing action may be understood by considering the geometry of the recorded control signals illustrated in FIG. 3. As previously stated, the disk surface is divided into sectors, e.g. 28, 30. Within the sectors 28, 30, data tracks, whose center lines e.g. 34, 36, 38 are shown, are concentrically located on the disk. Before each sector, gap markers, e.g. 40, 42, are inserted to indicate the starte of a new sector, and following the gap markers are track identifiers and sector address blocks e.g. 44, 46. The servo information is carried in bursts e.g. 52, 54, 56, 58, 60, 62 which immediately follow the track identifiers. For example, one set of servo bursts 52, 54 is seen to straddle the center line of the track 34; one such servo burst, 52, being slightly in advance of the other servo burst, 54. The servo burst 52 is comprised of the unique recorded frequency, and its companion servo burst 54 is comprised of a different unique frequency. For the direction of disk rotation shown in FIG. 3, if the read head is centered directly over the center line 34 of the track, the head will read a signal having a frequency derived from the burst 52 followed by an equal amplitude signal having a frequency derived from the burst 54. If the head is off center, the amplitude of one read servo bust will exceed that of the other, and the relative amplitudes of the differing frequency signals of the two companion servo bursts will be indicative of the magnitude and direction of offset. The read servo signals, readily identified in each sector because of the times of their occurrence and their unique frequencies, are fed to a closed loop head positioning servo which drives the head actuator in such a direction as to equalize the read amplitudes of the servo bursts and thereby center the head over the track.

Disks for use in high density drives must be prerecorded with the servo burst data and the other control signals, such as the gap markers. In order to preserve machine-to-machine interchangeability, the prerecorded control information must be precisely positioned on each disk. Highly accurate, specialized, and expensive disk drives known as "servowriters" are used for this task. The procedure for recording the servo bursts is a slow process requiring an appreciable amount of labor for loading and unloading disks. It will also be appreciated that because the servo bursts signals are magnetically recorded, they are susceptible to inadvertent erasure. The present invention, utilizing a technique for the electrodeposition of particulate media for disk fabrication which is disclosed in copending U.S. patent application No. 900,210, the title of which is "Improved Particulate Magnetic Recording Media and Method of Manufacture Thereof" filed in the name of Jagannathan, teaches incorporating the servo burst and other control signal patterns as an integral part of the magnetic recording layer's structure itself during disk fabrication. This not only obviates the necessity of prerecording the servo information by means of the expensive servowriter procedure, but desirably provides disks embodying unerasable, permanent servo and control information by means of the media fabrication process alone.

The process described in the above referenced copending U.S. patent application Ser. No. 900,210 may be understood by reference to FIG. 4. (As explained in the copending application, the electrodeposited medium may be deposited either on the anode or the cathode depending upon the specific composition of the electrodeposition mixture. For sake of descriptive simplicity, the present discussion assumes the medium is deposited on the cathode.) A vessel 64 contains a mixture 66 of solvent, binder and surfactant which is continuously cycled through a sand mill 68 in order to maintain the mixture 66 in a homogenous state. A typical composition of the mixture 66 consists of the following components by weight:

| | |
|---|---|
| Cyclohexanone as solvent | 80.5% |
| Magnetic particles | 16.1 |
| Polyurethane as binder | 2.3 |
| Surfactant | 1.1 |

Figure 5:
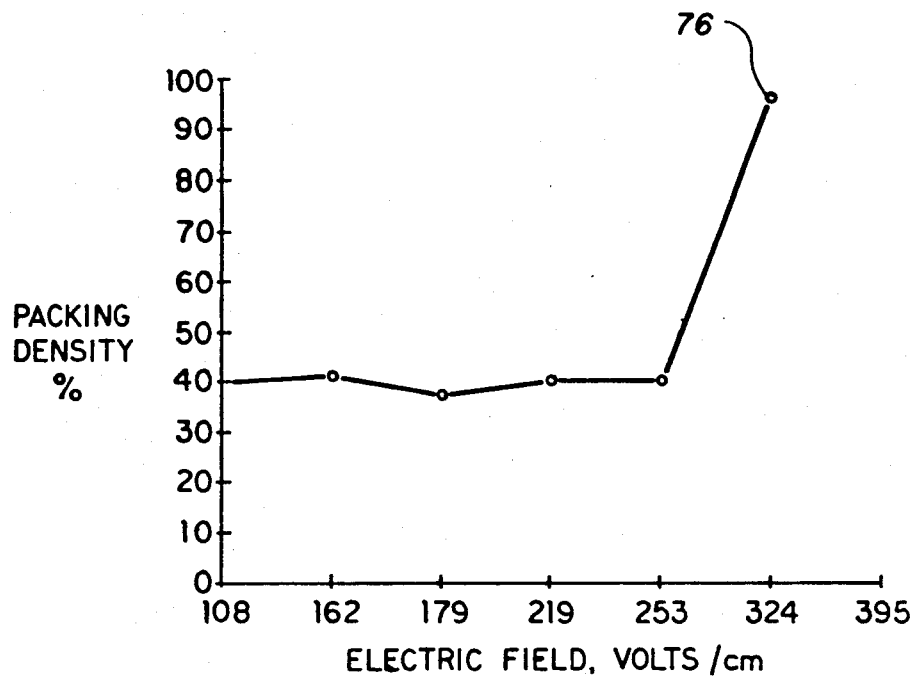
Figure 6A:
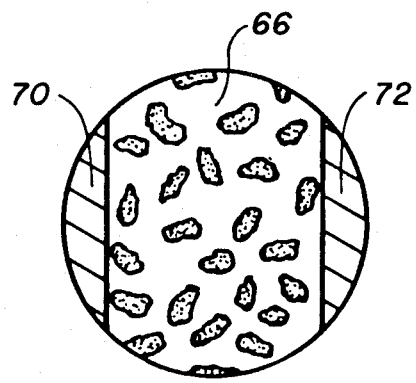
Figure 6B:
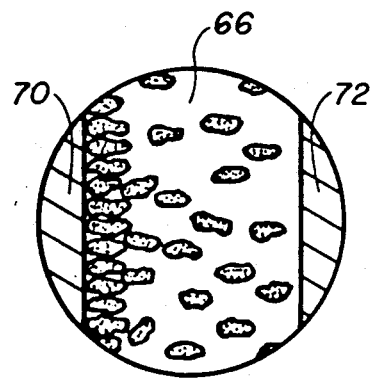

Immersed in the mixture 66 are an anode 72 and a cathode 70. A voltage source 74 connected across the electrodes establishes an electric field between them. Under the influence of the electric field, the magnetic particles present in the mixture migrate to the cathode where they deposit as a magnetic coating. Copending U.S. patent application Ser. No. 900,210 discloses that the volumetric packing density of the resultant deposited medium varies with the magnitude of the applied electric field as illustrated in FIG. 5. (The phrase "volumetric packing density" or "packing density" is a term of art designating the ratio of the saturation magnetization of a given volume of the magnetic medium to the intrinsic saturation magnetization of the magnetic substance under consideration. It is a measure of the actual volumetric density of magnetic material forming the medium). For lower field intensities the resultant packing density is essentially constant, but at a critical field intensity 76 the packing density dramatically increases by approximately a factor of two. It is hypothesized that at the critical field intensity the magnetic particles become aligned with the electric field and deposit uniformly on the cathode resulting in a dense coating. FIG. 6a shows particles between the cathode 70 and anode 72 in an unaligned condition characteristic of the lower field intensities. Such particles tend to pile up at the electrode in a jumbled fashion with interstices present between the particles that result in a lower particle packing density. FIG. 6b, on the other hand, shows the particles aligned in the field, with the result that the more orderly arrangement of the particles arriving at the cathode 70 provides the increased packing density of particles in the medium.

As will appear below, this dependence of packing density on field intensity is utilized in the present invention to incorporate geometrical patterns into the medium comprising the disk by accordingly varying the packing density. The patterns of servo bursts or other control signals are, in this manner, directly structured into the medium during fabrication.

SUMMARY OF THE INVENTION

The present invention utilizes to advantage the above described deposition technique to provide an electrodeposited medium having, in terms of packing density, the mirror image of an etched or machined pattern incised into the surface of an anode. As taught in copending U.S. patent application Ser. No. 900,210, electrodes are utilized which are basically parallel planes separated by a distance "d". The electric field "E" between them is akin to that of a parallel plate capacitor, and a voltage V applied across the electrodes creates the field E in a direction perpendicular to the electrodes, and of magnitude equal to V/d.

In the present invention, with the electrodes disposed for electrodeposition, the distance d between anode and cathode has two values due to the pattern detail incised in the anode surface. The distance d1 is the distance of the grooves of the incised pattern of the anode from the cathode, and the distance d2 is the distance of the lands from the cathode. In view of the relation E=V/d, two corresponding field values E1=V/d1 and E2=V/d2 are established. These field intensities are calculated so that E1 is equal to the critical field intensity, and E2 is less than the critical field intensity. At the positions on the cathode where the field has the value E1 the particles are deposited with the greater packing density, which as seen in FIG. 5 is substantially equal to 90% or equivalently 0.9, i.e., greater than a packing density of 0.5 and, at the positions where the field has the value E2, the particles are deposited with the lower packing density, as seen in FIG. 5 is substantially equal to 40% or equivalently 0.4, i.e. less than a packing density of 0.5 in accordance with the electrodeposition characteristic shown in the plot of FIG. 5. In this manner, a packing density variation in the deposited medium traces out the incised pattern of the anode. By keeping non-patterned portions of the anode surface at the distance d1 from the cathode, high packing density areas of the medium—suitable for data recording—are formed.

The resultant medium is then subjected to a d.c. magnetic field, and the variation in packing density gives rise to magnetized areas of essentially two magnetic field strengths. These field strength variations may be read by means of standard magnetic reproducing techniques. While the electrodeposited pattern is unerasable or unalterable because it is integral with the recording medium, the non-patterned portion of the electrodeposited medium surface may be recorded, reproduced, or erased by any of the magnetic recording and reproducing methods known in the art.

DESCRIPTION OF THE INVENTION

Figure 7:
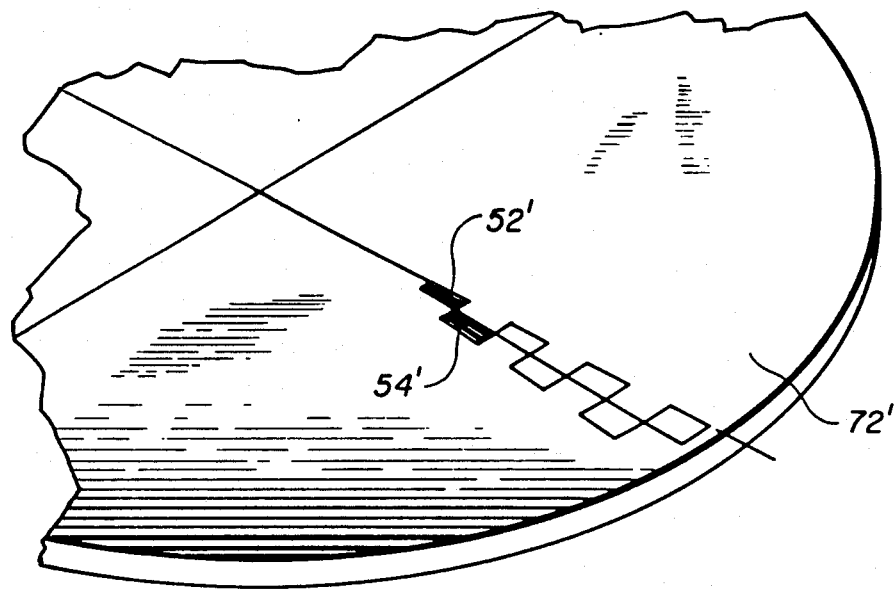
Figure 8:
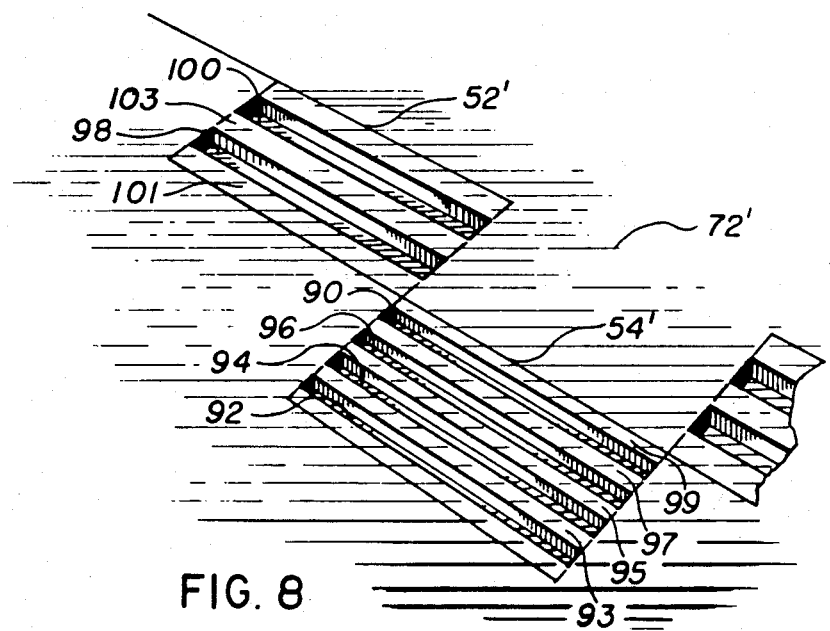

The practice of the invention may be understood by first considering the structure of the anode as illustrated in FIG. 7. Assume that the pattern to be replicated is comprised of the servo bursts shown in FIG. 3. (In the drawings different but related elements are identified with the same reference characters, albeit that corresponding elements in the various drawings are distinguished by the use of primes.) Referring to FIG. 7, the typical patterns 52', 54' corresponding to the servo bursts 52, 54 are shown incised in the anode 72'; they are positioned to correspond to the servo burst locations shown in FIG. 3. FIG. 8 shows the nature of the incised burst patterns 52', 54' in greater detail. As previously described, the servo bursts 52, 54 give rise to signals read from the medium which consist of unique frequencies. In the present invention these signals are not recorded but are derived by laying down regions of cyclically varying packing density in the electrodeposited medium. Referring to FIG. 8, the grooves 92, 94, 96, 90, 98, 100 incised in the anode 72' and the lands 93, 95, 97, 99, 101, 103 provide the mechanism by which the variation in density is achieved in a manner to be later described. It will be appreciated that the grooves 92, 94, 96, 90, 98, 100 are depressions with respect to the principal surface of the anode 72', and the pitch of the grooves is selected to correspond to the frequencies of the servo bursts. For example, grooves 92, 94, 96, 90 related to servo burst 52 have twice the pitch of the grooves 98, 100 related to the companion servo burst 54. The images of these grooves and associated lands in the packing density of the medium provide servo signals frequencies read by the disk head, during disk rotation, of 2f and f, where 1/f is the interval between the times of occurrence of the signals corresponding to grooves 98 and 100.

Figure 4:
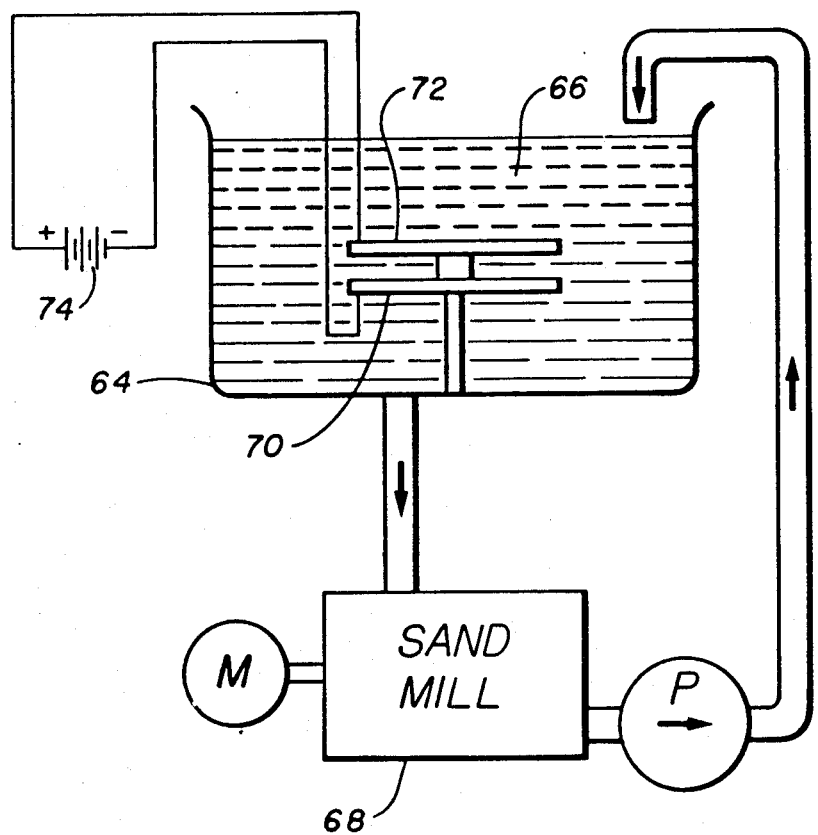
Figure 9:
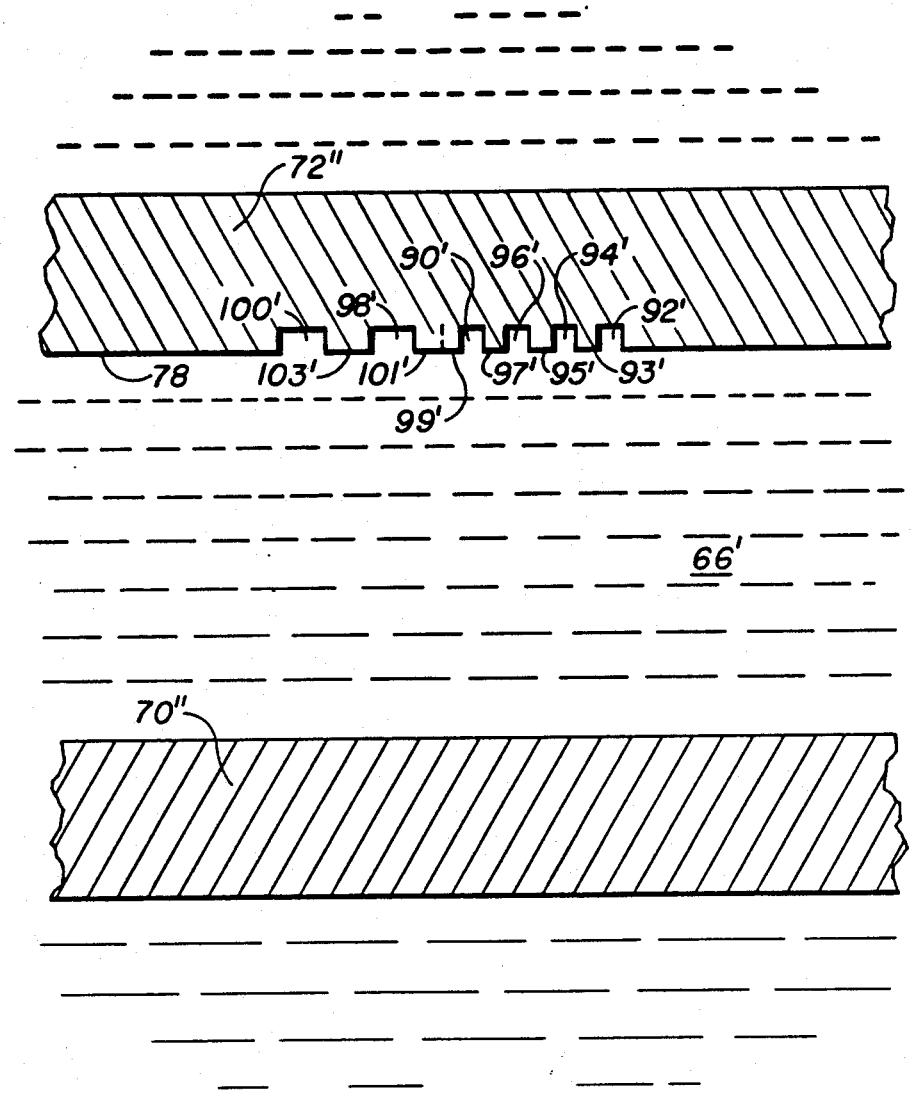

Referring to FIG. 9, portions of the anode 72" and cathode 70" are shown disposed for deposition of magnetic media by means of the apparatus of FIG. 4. A composition of the mixture 66' of particles, solvent, binder and surfactant for the electrodeposition of the medium has been previously described. The principal surface 78 of the anode 72" is essentially parallel to the cathode 70". The perpendicular distance from the cathode 70" to the principal surface 78 of the anode 72", and to the lands 93', 95', 97', 99', 101', 103' of the pattern that are coplanar with the principal surface 78 of the anode, is such that the resultant electric field at the surface of the cathode 70" is equal to the critical field. The perpendicular distance from the surface of the cathode 70" to the grooves 92', 94', 96', 90', 98', 100' of the anode 72" is such that the resultant electric field at the surface of the cathode 70" is less than the critical field. An applied voltage between cathode and anode of approximately 432 volts when the distance from the principal surface of the anode to the cathode is 1.33 cm provides the critical field of 325 volts/cm for the mix in question. Utilizing grooves in the pattern of the anode of at least 0.3 cm in depth provides a field sufficiently smaller than the critical field value for deposition of the groove images at the lower packing density. Under these conditions a 10 micron thick coating mirroring density-wise the pattern incised on the anode is deposited on the cathode in approximately 5 secs.

It will be observed in FIG. 9 that the surface of the cathode 70", upon which the medium is deposited, may be characterized as comprising two distinct subareas: a first subarea wherein the perpendicular distances from the anode 78" to the cathode 70" have the distances d1 previously defined, i.e. grooves in the anode pattern to cathode distances, and a second subarea wherein the perpendicular distances from the anode 78" to the cathode 70" have the distances d2 as previously defined, i.e., lands in the anode pattern to cathode distances. As previously explained, the packing density of the medium electrodeposited on the cathode mirrors the pattern of grooves and lands of the anode, and the electrodeposited medium will be, resultantly, divided into two corresponding subareas: one having an areal pattern of high packing density, i.e. approximately equal to 90% (or equivalently 0.9) and another having an areal pattern of low packing density i.e. approximately equal to 40% (or equivalently 0.4).

Figure 10:
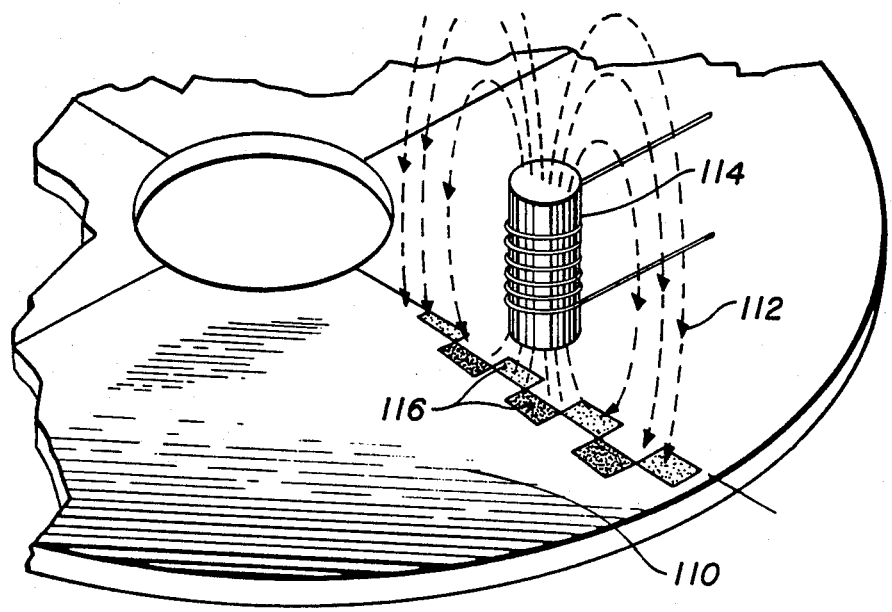
FIG. 10 is an illustration of the medium being magnetically saturated by means of a solenoid as taught by the invention.
Figure 11:
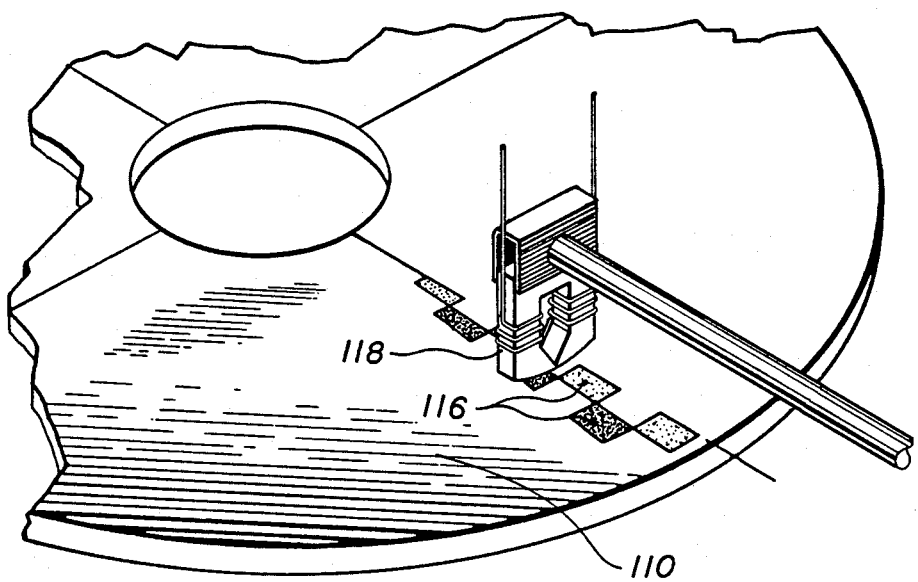
FIG. 11 is a drawing showing the pattern of varying magnetization of the medium according to the treaching of the invention being read by a conventional magnetic reproducing means.

After removal from the electrodeposition mixture, the medium is rinsed and dried referring to FIG. 10. The medium 110 is then magnetically saturated by means of a d.c. field derived either from a constant current solenoid 114 or a fixed magnet referring to FIG. 11, the pattern of varying packing density is thereby converted to a pattern of varying magnetization 116 which is readable by conventional magnetic reproducing means, 118, i.e., a reproduce magnetic head.

The invention has been described in detail with particular reference to preferred embodiments thereof, but it will be understood that variations and modifications can be effected within the spirit and scope of the invention. For example, although the invention has been couched and described in terms of disk media for use in data processing, the teaching of the invention may be applied in other applications utilizing magnetic media such as credit cards, identification badges with unalterable magnetic stripes, and the like.

What is claimed is:

1. A method of fabricating a magnetic medium by means of an electrodeposition apparatus utilizing particulate magnetic material and characterized by a critical field intensity, wherein the packing density of said magnetic medium varies in accordance with a predetermined pattern, said method comprising:

a. replicating said pattern by means of grooves and lands in a first electrode of said electrodeposition apparatus,
   b. positioning a second electrode in said electrodeposition apparatus in opposition to said first electrode and essentially parallel to said first electrode, wherein the electric field between the grooves of said first electrode and said second electrode has a first magnitude less than said critical electric field of said electrodeposition apparatus, and wherein the electric field between the lands of said first electrode and said second electrode has a second magnitude essentially equal to said critical electric field of said electrodeposition apparatus, and
   c. electrodepositing said medium on said second electrode under control of said electric field having said first and second magnitudes, whereby said pattern is imaged as a corresponding variation of said packing density of said medium.

* * * * *